(12) United States Patent
Momiuchi et al.

(10) Patent No.: US 6,870,862 B2
(45) Date of Patent: Mar. 22, 2005

(54) SOLID-STATE LASER DEVICE

(75) Inventors: Masayuki Momiuchi, Tokyo-to (JP); Taizo Eno, Tokyo-to (JP); Yoshiaki Goto, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 10/361,362

(22) Filed: Feb. 10, 2003

(65) Prior Publication Data

US 2004/0095980 A1 May 20, 2004

(30) Foreign Application Priority Data

Nov. 19, 2002 (JP) ........................................ 2002-335788

(51) Int. Cl.$^7$ .............................. H01S 3/10; H01S 3/08
(52) U.S. Cl. ........................................... 372/22; 372/92
(58) Field of Search ............................... 372/22, 92–93, 372/97–99, 105–106, 41, 25, 68, 23, 108

(56) References Cited

U.S. PATENT DOCUMENTS

| | | | | |
|---|---|---|---|---|
| 4,310,808 A | * | 1/1982 | Byer et al. ..................... 372/95 |
| 5,084,879 A | | 1/1992 | Suzuki et al. .................. 372/22 |
| 5,164,947 A | * | 11/1992 | Lukas et al. ................... 372/22 |
| 5,255,275 A | * | 10/1993 | Motegi .......................... 372/99 |
| 5,274,651 A | * | 12/1993 | Urakami ........................ 372/21 |
| 5,278,851 A | * | 1/1994 | Goto ............................ 372/19 |
| 5,278,852 A | * | 1/1994 | Wu et al. ...................... 372/22 |
| 5,287,381 A | | 2/1994 | Hyuga et al. .................. 372/75 |
| 5,343,485 A | * | 8/1994 | Okazaki ........................ 372/22 |
| 5,351,250 A | * | 9/1994 | Scott ............................. 372/3 |
| 5,355,246 A | * | 10/1994 | Tanuma ........................ 359/326 |
| 5,367,531 A | * | 11/1994 | Eguchi et al. ................. 372/98 |
| 5,541,765 A | * | 7/1996 | Tanuma ........................ 359/328 |
| 5,651,019 A | * | 7/1997 | Goldberg et al. ............. 372/68 |
| 5,671,240 A | * | 9/1997 | Okazaki ........................ 372/19 |
| 5,675,593 A | | 10/1997 | Oka ............................. 372/21 |
| 5,745,284 A | * | 4/1998 | Goldberg et al. ............ 359/344 |
| 5,805,626 A | * | 9/1998 | Komatsu et al. .............. 372/41 |
| 5,854,802 A | * | 12/1998 | Jin et al. ...................... 372/22 |
| 5,892,789 A | * | 4/1999 | Yasui et al. ................... 372/68 |
| 5,943,351 A | * | 8/1999 | Zhou et al. ................... 372/22 |
| 6,047,014 A | * | 4/2000 | Hyuga et al. ................. 372/108 |
| 6,130,900 A | * | 10/2000 | Black et al. .................. 372/25 |
| 6,356,575 B1 | * | 3/2002 | Fukumoto ..................... 372/97 |
| 6,393,034 B1 | * | 5/2002 | Konno et al. ................. 372/10 |

* cited by examiner

*Primary Examiner*—Minsu Harvey
*Assistant Examiner*—Phillip Nguyen
(74) *Attorney, Agent, or Firm*—Nields & Lemack

(57) ABSTRACT

A solid state laser device, comprising a first resonator and a second resonator provided on the same optical axis, a first optical axis of the first resonator, a second optical axis of the second resonator, a first separated optical axis portion being a part of the first optical axis, a second separated optical axis portion being a part of the second optical axis, a common optical axis portion where the first optical axis and the second optical axis are superimposed on each other, a first solid-state laser medium arranged on the separated optical axis portion of the first optical axis, a second solid-state laser medium arranged on the separated optical axis portion of the second optical axis, an optical crystal for wavelength conversion disposed on the common optical axis portion, and a wavelength separating plate for output disposed on one of the separated optical axis portions.

8 Claims, 4 Drawing Sheets

SOLID-STATE LASER DEVICE

BACKGROUND OF THE INVENTION

The present invention relates to a semiconductor laser device, in particular, to a solid-state laser device, and further relates to a solid-state laser device which is oscillated in two wavelengths by a resonator and converts the wavelength in the resonator.

A diode pumped solid-state laser is known, which uses intracavity type SHG mode to convert frequency of a laser beam from a fundamental frequency.

Referring to FIG. 5, description will be given on general features of the diode pumped solid-state laser of one-wavelength oscillation.

In FIG. 5, reference numeral 2 denotes a light emitter, and 3 is an optical resonator. The light emitter 2 comprises an LD light emitter 4 and a condenser lens 5. Further, the optical resonator 3 comprises a laser crystal 8 where a dielectric reflection film 7 is formed, a nonlinear optical medium (NLO) 9, and a concave mirror 12 where a dielectric reflection film 11 is formed. A laser beam is pumped at the optical resonator 3, and the laser beam is outputted by resonation and amplification. As the laser crystal 8, Nd:YVO$_4$ may be used. As the nonlinear optical medium 9, KTP (KTiOPO$_4$; titanyl potassium phosphate) may be used.

Further description will be given below.

A laser light source 1 is used to emit a laser beam with a wavelength of 809 nm, for instance, and the LD light emitter 4, i.e. a semiconductor laser, is used. The LD light emitter 4 has the function as a pumping light generator for generating an excitation light. The laser light source 1 is not limited to the semiconductor laser, and any type of light source means can be adopted so far as it can emit a laser beam.

The laser crystal 8 is used for amplification of light. As the laser crystal 8, Nd:YVO$_4$ with an oscillation line of 1064 nm is used. In addition, YAG (yttrium aluminum garnet) doped with Nd$^{3+}$ ion or the like is adopted. YAG has oscillation lines of 946 nm, 1064 nm, 1319 nm, etc. Also, Ti (sapphire) with oscillation lines of 700–900 nm can be used.

On the LD light emitter 4 side of surfaces of the laser crystal 8, a first dielectric reflection film 7 is formed. The first dielectric reflection film 7 is highly transmissive to a laser beam from the LD light emitter 4 and is highly reflective to an oscillation wavelength of the laser crystal 8, and it is also highly reflective to SHG (second harmonic generation).

The concave mirror 12 is designed to face to the laser crystal 8. The laser crystal 8 side of surfaces of the concave mirror 12 is fabricated in form of a concaved spherical mirror having an adequate radius and a second dielectric reflection film 11 is formed on it. The second dielectric reflection film 11 is highly reflective to the oscillation wavelength of the laser crystal 8, and it is highly transmissive to SHG (second harmonic generation).

As described above, when the first dielectric reflection film 7 of the laser crystal 8 is composed with the second dielectric reflection film 11 of the concave mirror 12 and the laser beam from the LD light emitter 4 is pumped to the laser crystal 8 via the condenser lens 5, the light is reciprocally projected between the first dielectric reflection film 7 of the laser crystal 8 and the second dielectric reflection film 11. Thus, the light can be confined for longer time, and the light can be resonated and amplified.

The nonlinear optical medium 9 is inserted in the optical resonator, which comprises the first dielectric reflection film 7 of the laser crystal 8 and the concave mirror 12. When an intensive coherent light such as a laser beam enters the nonlinear optical medium 9, a second harmonic wave to double the light frequency is generated. The generation of the second harmonic wave is called "second harmonic generation (SHG)". As a result, a laser beam with a wavelength of 532 nm is emitted from the laser light source 1.

In the laser light source 1 as described above, the nonlinear optical medium 9 is inserted into the optical resonator, which comprises the first dielectric reflection film 7 of the laser crystal 8 and the concave mirror 12, and it is called an intracavity type SHG. Because conversion output is proportional to square of excited photoelectric power, there is such effect that high light intensity in the optical resonator can be directly utilized.

Further, a type of solid-state laser device is known, by which an entered laser beam of a fundamental frequency is oscillated to two different wavelengths and these are further converted to different frequencies by using sum frequency mixing (SFM) and differential frequency mixing (DFM).

Description will be given on the solid-state laser device as described above referring to FIG. 6. In FIG. 6, the LD light emitter 4 and the condenser lens 5 are omitted.

As seen from the LD light emitter 4, there are arranged a concave mirror 12, a laser crystal 8, a first plane reflection mirror 14, a nonlinear optical medium 9, a second plane reflection mirror 15, and a third plane reflection mirror 16.

The concave mirror 12 is highly transmissive to a wavelength $\lambda i$ (809 nm in the figure), and it is highly reflective to a wavelength $\lambda 1$ (1342 nm in the figure) and a wavelength $\lambda 2$ (1064 nm in the figure). The first plane reflection mirror 14 is highly reflective to SFM (wavelength $\lambda 3$=593 nm in the figure) and is highly transmissive to the wavelengths $\lambda 1$ and $\lambda 2$. The second plane reflection mirror 15 is highly transmissive to the wavelengths $\lambda 3$ and $\lambda 2$, and it is highly reflective to the wavelength $\lambda 1$. The third plane reflection mirror 16 is highly transmissive to the wavelength $\lambda 3$ and is highly reflective to the wavelength $\lambda 2$.

The excitation light $\lambda i$ entered through the concave mirror 12 excites the laser crystal (Nd:YVO$_4$). Among the natural released light beams, the light beams with the wavelengths $\lambda 1$ and $\lambda 2$ are pumped and resonated between the concave mirror 12 and the second plane reflection mirror 15 and between the concave mirror 12 and the third plane reflection mirror 16. The wavelength of $\lambda 1$ is excited and amplified, and the wavelength of $\lambda 2$ is excited and amplified. Further, the laser beams with both wavelengths pass through the nonlinear optical medium 9. As a result, sum frequency $\lambda 3$ of both wavelengths can be obtained, and the laser beam passes through the third plane reflection mirror 16 and is projected.

In case of sum frequency mixing (SFM), there exists a relationship: $1/\lambda 3 = 1/\lambda 1 + 1/\lambda 2$. By selecting the nonlinear optical medium 9, differential frequency mixing (DFM) can be obtained. In this case, there exists a relationship: $1/\lambda 3 = 1/\lambda 1 - 1/\lambda 2$ (where $\lambda 1 < \lambda 2$).

In the frequency conversion of the above described solid-state laser device for generating sum frequency mixing (SFM) and differential frequency mixing (DFM), it is advantageous in that wavelength conversion can be achieved with high efficiency by arranging the nonlinear optical medium 9 in the optical resonator.

A conventional type example as described above is written in, for instance, F. chen. and S. W. Tssi: Opt. Lett. 27 (2002), 397.

In the solid-state laser device shown in FIG. 6, sum frequency mixing (SFM) and differential frequency mixing (DFM) are generated, and frequency conversion is performed. It is advantageous in that wavelength conversion can be carried out with high efficiency, while it has the following disadvantages:

The laser beam, which can be inputted to the laser crystal 8, is under excitation input limitation at a breakdown threshold value of the crystal, and it is difficult to have high output.

In order to raise excitation efficiency, the fundamental wave with the wavelength λ1 is needed to be on the same optical axis as the fundamental wave with the wavelength λ2. Because the concave mirror 12, the second plane reflection mirror 15 and the third plane reflection mirror 16 are arranged on a common optical axis, it is difficult to perfectly match the two optical axes with the wavelengths of λ1 and λ2 by adjusting the concave mirror 12, the second plane reflection mirror 15 and the third plane reflection mirror 16.

Further, the nonlinear optical medium 9 must be arranged on a portion of the laser beam with higher energy density (beam waist) in order to have higher efficiency. The beam waist (ω) is obtained from the equation (1) given below, and the position is different if the wavelength λ is different. Therefore, as shown in FIG. 6, if the laser crystal 8 is provided commonly for the wavelengths λ1 and λ2, the nonlinear optical medium 9 cannot be placed at the position of the beam waist of the wavelength λ1 and of the beam waist of the wavelength λ2, and conversion efficiency is decreased.

$$\omega = \sqrt{\{\lambda\sqrt{[L(R-L)]}/\pi\}} \quad (1)$$

where L denotes length of the resonator, provided neglecting, for symplification, crystal effects (thermal lens effects, optical path change, etc.), and R is curvature of the concave mirror.

SUMMARY OF THE INVENTION

It is an object of the present invention to provide a solid-state laser device, by which it is possible to obtain high output, to easily perform the matching of optical axes with two wavelengths, and to provide high efficiency and to carry out frequency conversion.

To attain the above object, the solid-state laser device according to the present invention comprises a first resonator and a second resonator provided on the same optical axis, a first optical axis of the first resonator, a second optical axis of the second resonator, a first separated optical axis portion being a part of the first optical axis, a second separated optical axis portion being as a part of the second optical axis, a common optical axis portion where the first optical axis and the second optical axis are superimposed on each other, a first solid-state laser medium arranged on the separated optical axis portion of the first optical axis, a second solid-state laser medium arranged on the separated optical axis portion of the second optical axis, an optical crystal for wavelength conversion disposed on the common optical axis portion, and a wavelength separating plate for output disposed on one of the separated optical axis portions. Also, the present invention provides the solid-state laser device as described above, wherein the first resonator and the second resonator comprise concave mirrors and plane mirrors, the concave mirrors are arranged respectively on the separated optical axis portions, and the plane mirrors are arranged on the common optical axis portion. Further, the present invention provides the solid-state laser device as described above, wherein there are provided a first light emitter for entering an excitation light to the first resonator and a second light emitter for entering an excitation light to the second resonator, and the first light emitter and the second light emitter can be independently driven. Also, the present invention provides the solid-state laser device as described above, wherein reflection surfaces are formed on excitation light incident surfaces of the first solid-state laser medium and the second solid-state laser medium, reflection surfaces are formed on both surfaces of the optical crystal for wavelength conversion, the first resonator is made up between the reflection surface of the first solid-state laser medium and the reflection surface on the second solid-state laser medium side of the optical crystal for wavelength conversion, and the second resonator is made up between the reflection surface of the second solid-state laser medium and the reflection surface on the first solid-state laser medium side of the optical crystal for wavelength conversion. Further, the present invention provides the solid-state laser device as described above, wherein the first solid-state laser medium and the second solid-state laser medium are positioned at converging points of the excitation light on the separated optical axis portions of the first resonator and the second resonator respectively. Also, the present invention provides the solid-state laser device as described above, wherein the optical member for wavelength conversion is provided on a beam waist portion of the common optical axis portion. Further, the present invention provides the solid-state laser device as described above, wherein at least one of the first resonator or the second resonator comprises a Q-sw. Also, the present invention provides the solid-state laser device as described above, wherein there are provided a plurality of optical crystals for wavelength conversion of different wavelengths, and the optical crystals for wavelength conversion can be independently placed to or removed from the common optical axis portion. Further, the present invention provides the solid-state laser device as described above, wherein the first light emitter and the second light emitter have a plurality of LD light emitting elements, laser beams from each of the LD light emitting elements are bundled together by bundling optical fibers and are entered to the first resonator and the second resonator. Also, the present invention provides the solid-state laser device as described above, wherein there are provided a plurality of the solid-state laser devices, and there is provided an optical means for combining the laser beams emitted from the solid-state laser devices so that the laser beams have the same optical axis.

DETAILED DESCRIPTION OF THE PREFERRED EMBODIMENTS

Figure 1:
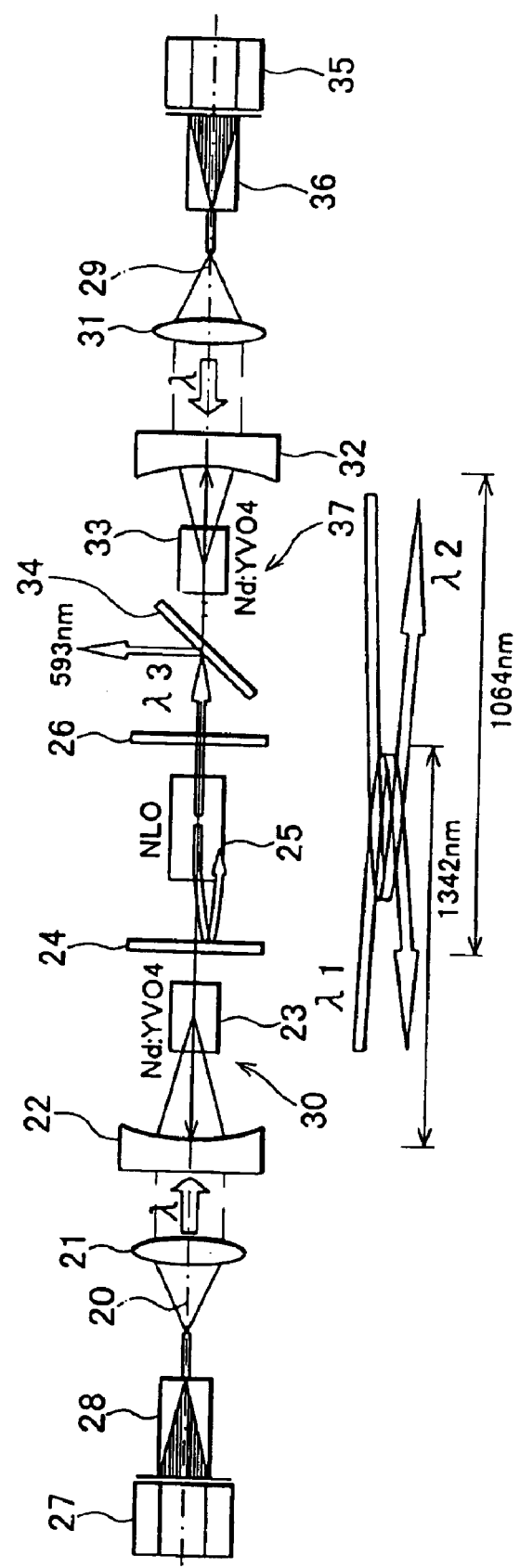
FIG. 1 is a schematical block diagram of a first embodiment of the present invention.

Description will be given below on embodiments of the present invention referring to the drawings.

FIG. 1 shows a first embodiment of the invention. A first concave mirror 22, a first solid-state laser medium 23, a reflection mirror 24 for a second resonator, an optical crystal (NLO) 25 for wavelength conversion, a reflection mirror 26 for a first resonator, a wavelength separating plate 34 for output, a second solid-state laser medium 33, and a second concave mirror 32 are arranged on the same optical axis. A first resonator 30 is made up between the first concave mirror 22 and the reflection mirror 26 for the first resonator, and a second resonator 37 is made up between the second concave mirror 32 and the reflection mirror 24 for the second resonator. A portion between the reflection mirror 24 for the second resonator and the reflection mirror 26 for the first resonator is used commonly by a first optical axis 20 and a second optical axis 29.

An LD light emitter 27 is positioned to face a first condenser lens unit 21, and the LD light emitter 27 has a predetermined number of LDs arranged in one row. Laser beams emitted from each LD are bundled together by bundling optical fibers 28 and are entered to the first condenser lens unit 21 as a combined laser beam.

An LD light emitter 35 is positioned to face a second condenser lens unit 31, and the LD light emitter 35 has a predetermined number of LDs arranged in one row. Laser beams emitted from each LD are bundled together by bundling optical fibers 36 and are entered to the second condenser lens unit 31 as a combined laser beam.

The first concave mirror 22 is highly transmissive to a wavelength $\lambda$ which is an excitation light and it is highly reflective to a wavelength $\lambda 1$ of a first fundamental wave. The reflection mirror 24 for the second resonator is highly transmissive to the wavelength $\lambda 1$ and it is highly reflective to a wavelength $\lambda 2$ of a fundamental wave. Further, it is also highly reflective to a wavelength $\lambda 3$ of a wavelength conversion light [sum frequency mixing (SFM) or differential frequency mixing (DFM); Hereinafter, description will be given on sum frequency mixing (SFM).]. The reflection mirror 26 for the first resonator is highly reflective to the first fundamental wave $\lambda 1$, and it is highly transmissive to the second fundamental wave $\lambda 2$ and the wavelength conversion light $\lambda 3$.

The wavelength separating plate 34 for output is highly transmissive to the second fundamental wave $\lambda 2$ and it is highly reflective to the wavelength conversion light $\lambda 3$. The second concave mirror 32 is highly transmissive to the excitation light $\lambda$ and it is highly reflective to the second fundamental wave $\lambda 2$.

In the arrangement as described above, the LD light emitter 27 and the LD light emitter 35 emit $\lambda=809$ nm as excitation light, and Nd:YVO4 having oscillation lines of 1342 nm and 1064 nm is used as the first solid-state laser medium 23 and the second solid-state laser medium 33. In this case, KTP is used as the optical crystal 25 for wavelength conversion. A distance L1 between a reflection surface of the first concave mirror 22 and a reflection surface of the reflection mirror 26 for the first resonator, and a distance L2 between a reflection surface of the second concave mirror 32 and a reflection surface of the reflection mirror 24 for the second resonator as set in such manner that a beam waist $\omega 1$ of the first resonator 30 and a beam waist of $\omega 2$ of the second resonator 37 are approximately equal to each other.

From the equation (1):

$$\omega 1^2 = \lambda 1 \sqrt{L1(R1-L1)}/\pi$$

$$\omega 2^2 = \lambda 2 \sqrt{L2(R2-L2)}/\pi$$

If it is assumed that $\omega 1$ and $\omega 2$ are approximately equal to each other, then:

$$\lambda 1^2 L1(R1-L1) = \lambda 2^2 L2(R2-L2)$$

(where R1 and R2 each represents radius of curvature of the concave mirrors 22 and 32 respectively).

The laser beams emitted from the LD light emitter 27 are converged by the first condenser lens unit 21 into the first solid-state laser medium 23 via the optical fibers 28, and a laser beam of the first fundamental wave $\lambda 1=1342$ nm is oscillated between the first concave mirror 22 and the reflection mirror 26 for the first resonator. The laser beams emitted from the LD light emitter 35 are converged by the second condenser lens unit 31 into the second solid-state laser medium 33 via the optical fibers 36, and a laser beam of the second fundamental wave $\lambda 2=1064$ nm is oscillated between the reflection mirror 24 for the second resonator and the second concave mirror 32.

Further, when the laser beams of the first fundamental wave $\lambda 1$ and the second fundamental wave $\lambda 2$ pass through the optical crystal 25 for wavelength conversion, sum frequency of 593 nm is generated. The laser beam with wavelength of 593 nm directed toward the reflection mirror 24 for the second resonator is reflected by the reflection mirror 24 for the second resonator, and it is further reflected by the wavelength separating plate 34 for output and is projected as a laser beam with the wavelength of 593 nm.

In the arrangement of the solid-state laser device as described above, the first resonator 30 and the second resonator 37 are optically separated other than the optical crystal 25 for wavelength conversion. Thus, an excitation light projected from the LD light emitter 27 into the first resonator 30 forms a converging point between the first concave mirror 22 and the reflection mirror 24 for the second resonator in the figure, and this converging point is positioned within or closer to the first solid-state laser medium 23. Similarly, the laser beam projected from the LD light emitter 35 into the second resonator 37 forms a converging point between the second concave mirror 32 and the wavelength separating plate 34 in the figure, and this converging point is positioned within or closer to the second solid-state laser medium 33.

Excitation efficiency of the first solid-state laser medium 23 and the second solid-state laser medium 33 is influenced by an energy density of the laser beam or by a direction of polarization. However, positions of the first solid-state laser medium 23 and the second solid-state laser medium 33 can be independently adjusted. As a result, these can be set at optimal positions. Also, the direction of polarization can be adjusted independently for the LD light emitter 27 and for the LD light emitter 35, and the adjustment can be made in easy manner. In the positional adjustment of the optical member, e.g., in the matching of optical axes of the first concave mirror 22 and the second concave mirror 32, the adjustment of one of the first concave mirror 22 and the second concave mirror 32 exerts no influence on the adjustment of another concave mirror. Accordingly, after the adjustment of one of the first concave mirror 22 and the second concave mirror 32 has been completed, the other concave mirror can be adjusted, and this makes the adjustment much easier. Further, it can be designed in such manner that polarization of two fundamental lights can be made parallel or perpendicular to each other. Thus, there is no restriction to the optical crystal 25 for wavelength conversion, and any type of optical crystal for wavelength conversion can be used.

It is possible to design that the common portion of the first optical axis 20 and the second optical axis 29 perfectly concur with each other. By making them perfectly concur with each other, conversion efficiency of the optical crystal 25 for wavelength conversion can be improved.

Also, it may be designed in such manner that the first resonator and the second resonator are oscillated with the same wavelength ($\lambda 1=\lambda 2$). In this case, a polarization separating plate (P/S) is used as the wavelength separating plate 34. Oscillation wavelength is 1064 nm (532 nm for green) when Nd:YAG is used, for instance.

When a plurality of optical crystals 25 for wavelength conversion are prepared and angle adjustment is made on each of the plurality of optical crystals 25 for differential frequency DFM, SHG1 ($\lambda 1/2$), and SHG2 ($\lambda 2/2$) respectively, and when these are separately inserted into the common optical axis portion of the first optical axis 20 and the second optical axis 29, 5136 nm is obtained as DFM, 671 nm is obtained as SHG1 ($\lambda 1/2$), and 532 nm as SHG2 ($\lambda 2/2$).

Specifically, when the optical crystal 25 for wavelength conversion used for DFM is inserted under the condition that the laser beams are projected from the LD light emitter 27 and the LD light emitter 35, a laser beam of differential frequency DFM is outputted. When the optical crystal 25 for wavelength conversion used for 1342 nm is inserted under the condition that the laser beam from the LD light emitter 27 only is projected, a laser beam with wavelength of 671 nm is outputted. When the optical crystal 25 for wavelength conversion used for 1064 nm is inserted under the condition that the laser beam from the LD light emitter 35 only is projected, a laser beam with wavelength of 532 nm is outputted.

Under the arrangement as described above, only the laser beam from the LD light emitter 27 is projected to the first solid-state laser medium 23, and only the laser beam from the LD light emitter 35 is projected to the second solid-state laser medium 33. Accordingly, the load applied on the first solid-state laser medium 23 and the second solid-state laser medium 33 are low, and a wavelength conversion light is obtained from the laser beams from two sets of light emitters, i.e. the LD light emitter 27 and the LD light emitter 35. Thus, high output can be achieved.

As the optical crystal 25 for wavelength conversion, BBO ($\beta$-BaB$_2$O$_4$; $\beta$-lithium borate), LBO (LiB$_3$O$_5$; lithium triborate), KNbO$_3$ (potassium niobate), etc. may be adopted in addition to KTP.

Figure 2:
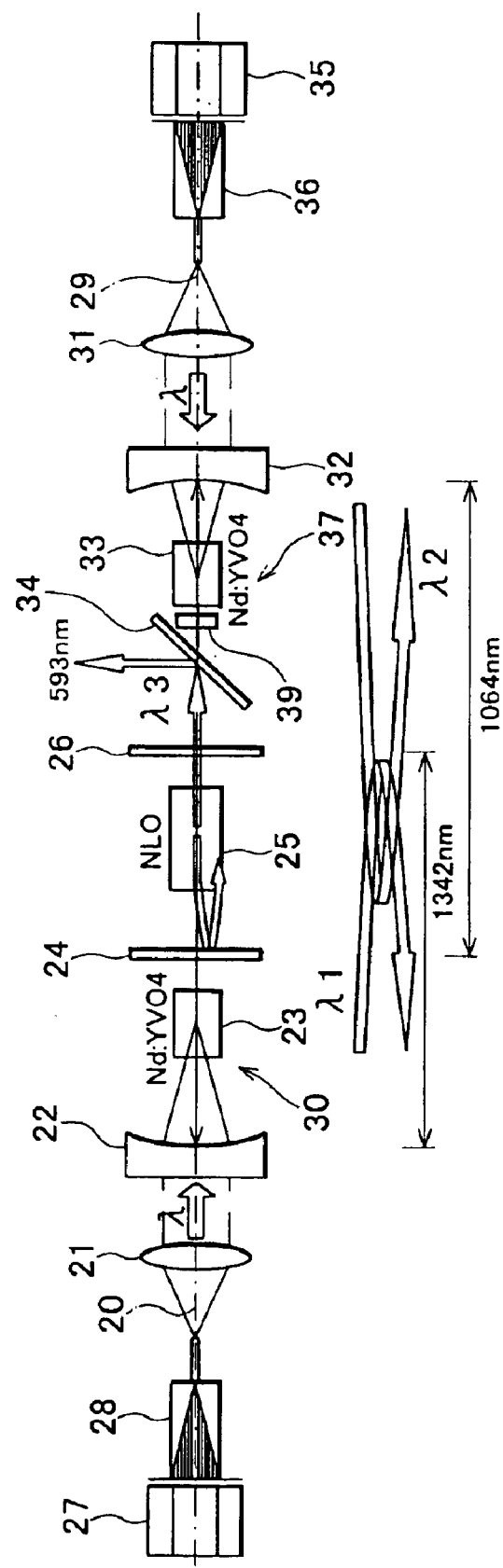
FIG. 2 is a schematical block diagram of an essential portion of a second embodiment of the present invention.

FIG. 2 shows a second embodiment of the present invention. In FIG. 2, the same component as shown in FIG. 1 is referred by the same symbol and the description is not given here.

A Q-sw 39 is disposed between the second solid-state laser medium 33 of the second resonator 37 and the wavelength separating plate 34 for output. The Q-sw 39 comprises a saturable absorber (crystal). The Q-sw 39 absorbs the incident laser beam under saturable condition. When an amount of absorption exceeds a predetermined level, the laser beam is emitted. Thus, the Q-sw 39 carries out switching action. As a result, the laser beam emitted from the solid-state laser device is emitted in pulsed state by the switching action of the Q-sw 39.

As the material of the Q-sw 39, Cr:YAG, semiconductor, etc., may be used, and AO (acoustooptic), EO (electrooptic) Q-sws also may be used.

Normally, on a crystal end surface of a laser crystal, concave mirror action occurs due to thermal lens effect caused by the excitation. Therefore, it may be designed in such manner that the first concave mirror 22 and the second concave mirror 32 are omitted, and that reflection surfaces for resonator may be formed on an end surface on the LD light emitter 27 side of the first solid-state laser medium 23 and on an end surface on the LD light emitter 35 side of the second solid-state laser medium 33.

Figure 3:
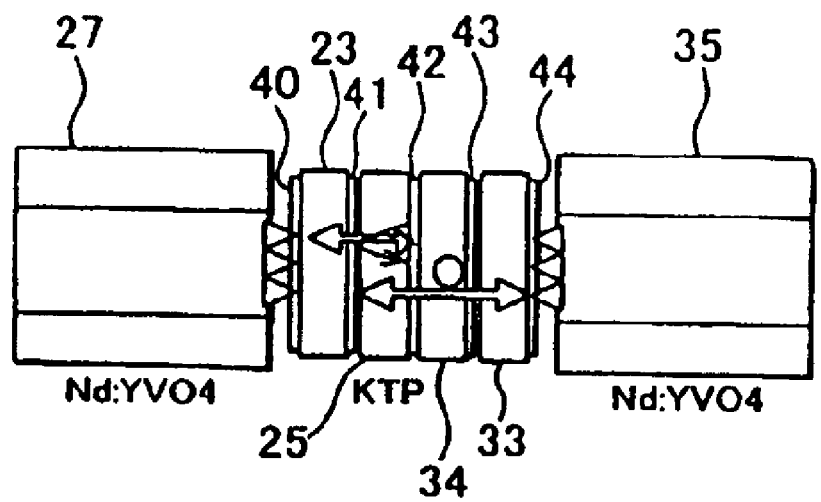
FIG. 3 is a schematical plan view of an essential portion of a third embodiment of the present invention.
Figure 4:
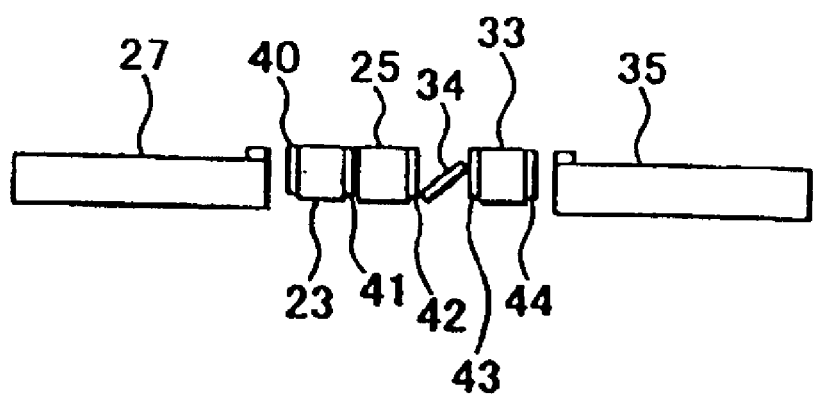
FIG. 4 is a schematical frontal view of an essential portion of the third embodiment of the present invention.
Figure 5:
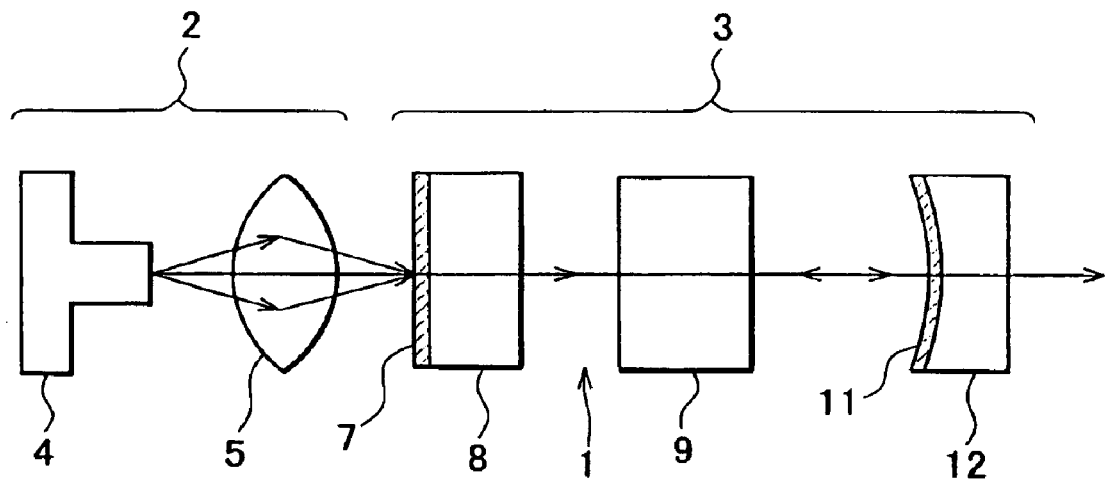
FIG. 5 is a schematical block diagram of a conventional type device.
Figure 6:
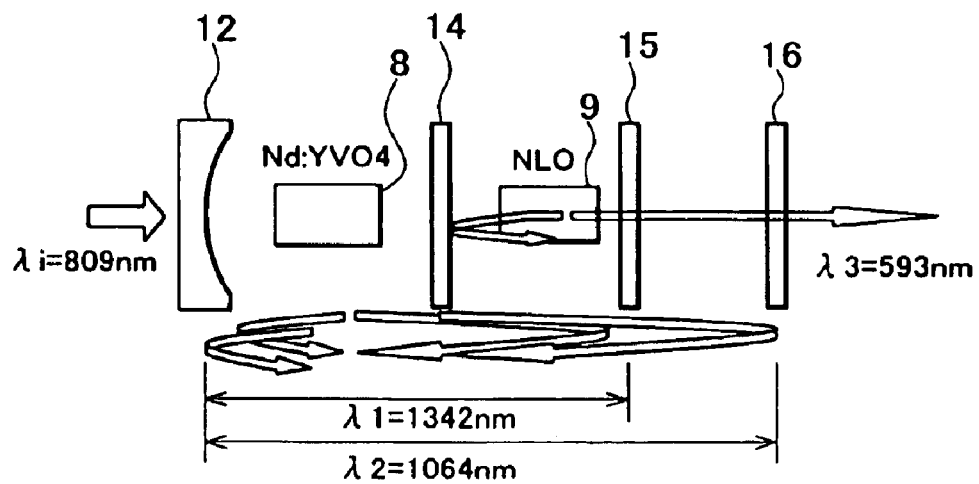
FIG. 6 is a schematical block diagram of another type of conventional device.

In a third embodiment of the present invention shown in FIG. 3 and FIG. 4, the first concave mirror 22, the second concave mirror 32, the reflection mirror 24 for the second resonator, and the reflection mirror 26 for the first resonator in the above embodiment are omitted.

The first solid-state laser medium 23 is arranged on the same optical axis as the LD light emitter 27 so as to face each other. The optical crystal 25 for wavelength conversion is positioned adjacent to the first solid-state laser medium 23. And the wavelength separating plate 34 is placed between the second solid-state laser medium 33 and the optical crystal 25. The LD light emitter 35 is arranged to face to the second solid-state laser medium 33.

On a surface of the first solid-state laser medium 23 facing to the LD light emitter 27, a dielectric reflection film 40 is formed, which is highly transmissive to an excitation light $\lambda$ and is highly reflective to the first fundamental wave $\lambda 1$. On a surface opposite to the surface facing to the LD light emitter 27 of the first solid-state laser medium 23, a dielectric reflection film 41 is formed, which is highly transmissive to the first fundamental wave $\lambda 1$ and is highly reflective to the second fundamental wave $\lambda 2$ and to the wavelength conversion light $\lambda 3$. The dielectric reflection film 41 may be formed on a surface of the optical crystal 25 for wavelength conversion facing to the first solid-state laser medium 23.

On a surface of the optical crystal 25 for wavelength conversion facing to the wavelength separating plate 34 for output, a film 42 is formed, and the film 42 is highly transmissive to the second fundamental wave $\lambda 2$ and the wavelength conversion light $\lambda 3$ and is highly reflective to the first fundamental wave $\lambda 1$. The wavelength separating plate 34 for output is highly transmissive to the first fundamental wave $\lambda 1$ and the second fundamental wave $\lambda 2$ and is highly reflective to the wavelength conversion light $\lambda 3$. On a surface of the second solid-state laser medium 33 facing to the wavelength separating plate 34 for output, a dielectric reflection film 43 is formed, and on a surface facing to the LD light emitter 35, a dielectric reflection film 44 is formed. The dielectric reflective film 43 is highly transmissive to the second fundamental wave $\lambda 2$. The dielectric reflection film 44 is highly transmissive to the excitation light $\lambda$ and is highly reflective to the second fundamental wave $\lambda 2$.

A first resonator is made up between the dielectric reflection film 40 and the dielectric reflection film 42. A second resonator is made up between the dielectric reflection film 44 and the dielectric reflection film 41.

The operation in the third embodiment is the same as the operation of the first embodiment explained in connection with FIG. 1, and description is not given here. In the third embodiment, the first concave mirror 22, the second concave mirror 32, the reflection mirror 24 for the second resonator, and the reflection mirror 26 for the first resonator are omitted, and this makes it possible to design the device in more compact size.

When the first solid-state laser medium 23 is positioned adjacent to the optical crystal 25 for wavelength conversion, and if a film is formed by vapor deposition around any one of the first solid state laser medium 23 and the optical crystal 25 for wavelength conversion—for instance, around the optical crystal 25 for wavelength conversion—an optical gap can be formed between the optical crystal 25 for wavelength conversion and the first solid-state laser medium 23 even when the first solid-state laser medium 23 is closely fitted to the optical crystal 25 for wavelength conversion.

Also, it may be designed in such manner that there are provided a plurality of the solid-state laser devices shown in FIG. 1, and the emitted laser beams may be combined by optical means such as optical fiber.

The solid-state laser device according to the present invention comprises a first resonator and a second resonator provided on the same optical axis, a first optical axis of the first resonator, a second optical axis of the second resonator, a first separated optical axis portion being a part of the first optical axis, a second separated optical axis portion being a part of the second optical axis, a common optical axis portion where the first optical axis and the second optical axis are superimposed on each other, a first solid-state laser medium arranged on the separated optical axis portion of the first optical axis, a second solid-state laser medium arranged on the separated optical axis portion of the second optical axis, an optical crystal for wavelength conversion disposed on the common optical axis portion, and a wavelength separating plate for output disposed on one of the separated optical axis portions. As a result, the first resonator and the second resonator can independently project excitation light respectively, and higher output can be obtained. Because optical axes of the first resonator and the second resonator are separated from each other, the matching of optical axes of two wavelengths can be carried out much easier.

Also, the invention provides the solid-state laser device as described above, wherein reflection surfaces are formed on excitation light incident surfaces of the first solid-state laser medium and the second solid-state laser medium, reflection surfaces are formed on both sides of the optical crystal for wavelength conversion, a first resonator is made up between the reflection surface of the first solid-state laser medium and the reflection surface of the second solid-state laser medium of the optical crystal for wavelength conversion, and the second resonator is made up between the reflection surface of the second solid-state laser medium and reflection surface of the optical crystal for wavelength conversion closer to the first solid-state laser medium. As a result, there is no need to provide a reflection mirror separately, and this makes it possible to design the device with simple structure and in compact size.

Further, the present invention provides the solid-state laser medium as described above, wherein the first solid-state laser medium and the second solid-state laser medium are provided at converging points of the excitation light on the separated optical axis portions of the first resonator and the second resonator respectively. Thus, excitation can be carried out with high efficiency, and the matching of optical axes can be carried out much easier. Beam waists of the fundamental waves are formed on the common portion of the first resonator and the second resonator. By providing the optical crystal for wavelength conversion, frequency conversion can be performed with high efficiency.

What is claimed is:

1. A solid state laser device, comprising a first resonator having a first optical axis and a second resonator having a second optical axis, where said first optical axis and said second optical axis are provided on the same optical axis, said first optical axis further comprising a first optical axis portion which is not part of said second optical axis, and a common optical axis portion where said first optical axis and second optical axis are superimposed on each other, said second optical axis further comprising a second optical axis portion which is not part of said first optical axis, and said common optical axis portion, a first solid-state laser medium arranged on said first optical axis portion, a second solid-state laser medium arranged on said second optical axis portion, an optical crystal for wavelength conversion disposed on said common optical axis portion, and a wavelength separating plate for output disposed on one of said first or second optical axis portions.

2. A solid-state laser device according to claim 1, wherein said first resonator and said second resonator each comprise a concave mirror and a plane mirror, said concave mirrors are arranged respectively on said first and second optical axis portions, and said plane mirrors are arranged on said common optical axis portion.

3. A solid-state laser device according to claim 1, wherein there are provided a first light emitter for projecting an excitation light to said first resonator and a second light emitter for projecting an excitation light to said second resonator, and said first light emitter and said second light emitter are adapted to be independently driven.

4. A solid-state laser device according to claim 1, wherein reflection surfaces are provided on excitation light incident surfaces of said first solid-state laser medium and said second solid-state laser medium, reflection surfaces are provided on both surfaces of said optical crystal for wavelength conversion, said first resonator is defined between the reflection surface of said first solid-state laser medium and the reflection surface on said second solid-state laser medium side of said optical crystal for wavelength conversion, and said second resonator is defined between the reflection surface on said second solid-state laser medium and the reflection surface on said first solid-state laser medium side of said optical crystal for wavelength conversion.

5. A solid-state laser device according to claim 1, wherein said first solid-state laser medium and said second solid-state laser medium are provided at converging points of the excitation light on said first and second optical axis portions of said first resonator and said second resonator.

6. A solid-state laser device according to claim 1, wherein said optical crystal for wavelength conversion is provided on a beam waist portion of said common option axis portion.

7. A solid-state laser device according to claim 1, wherein at least one of said first resonator or said second resonator comprises a Q-sw absorber.

8. A solid-state laser device according to claim 1, wherein there are provided a plurality of optical crystals for wavelength conversion of different wavelengths, and said optical crystals for wavelength conversion are independently placed to or removed from said common optical axis portion.

* * * * *